United States Patent [19]

Maejima et al.

[11] Patent Number: 4,777,496

[45] Date of Patent: Oct. 11, 1988

[54] THERMAL PRINTER WITH PRINTING PLATE MAKING MODE

[75] Inventors: Nobuyuki Maejima; Takehiko Sugawara, both of Iwate, Japan

[73] Assignee: Sony Corporation, Tokyo, Japan

[21] Appl. No.: 53,674

[22] Filed: May 26, 1987

[30] Foreign Application Priority Data

May 24, 1986 [JP] Japan ................................. 61-119600

[51] Int. Cl.$^4$ ........................................... G01D 15/10
[52] U.S. Cl. ............................. 346/76 PH; 400/120; 358/296
[58] Field of Search ......................... 400/120 PH, 120; 346/1.1, 76 R, 76 PH; 219/216, 216 PH; 258/75, 296, 298

[56] References Cited

U.S. PATENT DOCUMENTS

| 4,492,482 | 1/1985 | Eguchi et al. | 400/120 |
| 4,496,955 | 1/1985 | Maeyama et al. | 346/76 PH |
| 4,589,035 | 5/1986 | Yamanishi et al. | 358/75 |
| 4,672,393 | 6/1987 | Uchikata et al. | 346/76 |

FOREIGN PATENT DOCUMENTS

| 0144233 | 6/1985 | European Pat. Off. | 400/120 |
| 3241768 | 5/1983 | Fed. Rep. of Germany. | |
| 3302388 | 8/1983 | Fed. Rep. of Germany. | |
| 0126176 | 7/1983 | Japan | 346/76 R |
| 0126175 | 7/1983 | Japan | 346/76 R |
| 0126177 | 7/1983 | Japan | 346/76 R |
| 0138668 | 8/1983 | Japan | 346/76 R |
| 0148781 | 9/1983 | Japan | 346/76 R |
| 0045184 | 3/1984 | Japan | 400/120 |
| 0055755 | 3/1986 | Japan | 400/120 |
| 2117597 | 10/1983 | United Kingdom | 400/120 |
| 2143065 | 1/1985 | United Kingdom. | |

OTHER PUBLICATIONS

Electronic Design, vol. 30, No. 9, 04/29/82.

Primary Examiner—E. A. Goldberg
Assistant Examiner—Huan H. Tran

[57] ABSTRACT

A thermal printer has a plurality of head elements which are selectively energized for periods of time corresponding to tone levels of image densities. The thermal printer has a mode for recording necessary printing plate making information data such as print positioning marks and color information data or the like outside an effective image area to facilitate preparing block copies.

7 Claims, 6 Drawing Sheets

THERMAL PRINTER WITH PRINTING PLATE MAKING MODE

BACKGROUND OF THE INVENTION

1. Field of the Invention

The present invention relates to a thermal printer and, more particularly, to an improvement in a thermal printer suitably used for preparing a block copy.

2. Description of the Prior Art

Figure 1:
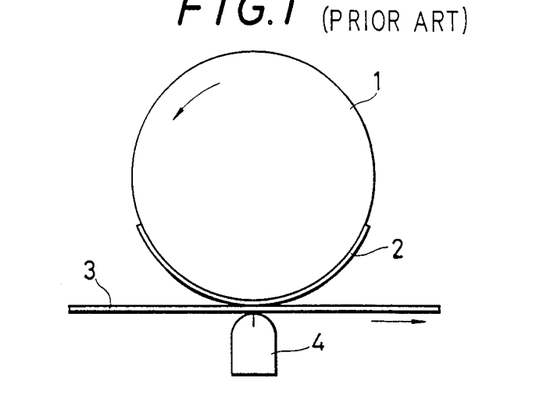
FIG. 1 is a schematic view showing the basic structure of a conventional thermal printer.
Figure 2:
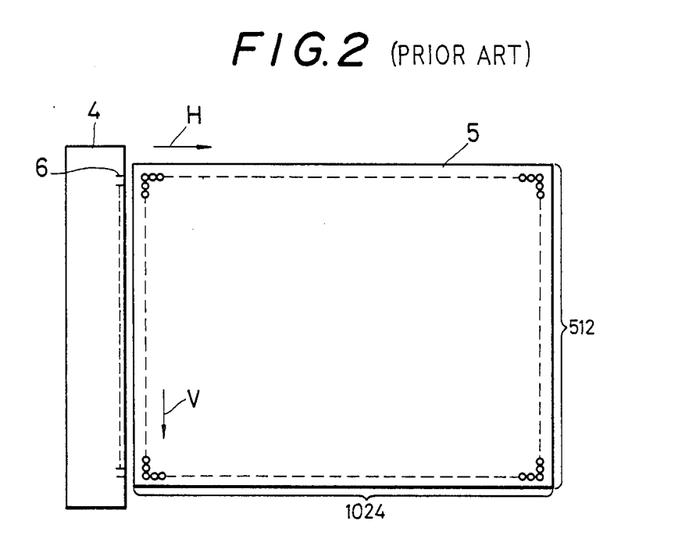
FIG. 2 is a schematic view showing an image printing head and an image area.

A typical conventional thermal printer is shown in FIG. 1. A thermal ink ribbon 3 overlays recording paper 2 wound around a platen 1. The thermal ink ribbon 3 and the recording paper 2 are selectively heated by a thermal head 4 to transfer ink from the ink ribbon 3 to the recording paper 2. In order to print a halftone image in a thermal printer, an image 5, divided into 1024×512 picture elements, is formed by scanning with the thermal head 4 having 512 heating elements 6 in the direction V indicated by the arrow shown in FIG. 2. In this case, the thermal head 4 is intermittently moved relative to the paper 1024 times for completing an image. The heating elements 6 are selectively energized and heated for periods of time corresponding to the image densities of the picture elements. The elements 6 are intermittently stopped to print a line extended in the V direction (which is here-in-after referred to as a V line). It should be noted the head 4 in the printer of FIG. 1 is fixed, and that the platen 1 is intermittently rotated to perform the required scanning.

In order to reproduce a full-color image, four ink ribbon sheets such as Y (yellow), M (magenta), C (cyan), and B (black) color ink ribbon sheets are used, and scanning is performed one color at a time. In some case, B (Black) color printing may be omitted.

The above conventional printer is disclosed in U.S. Pat. No. 4,496,955.

In the field of full-color printing, when four block copies, i.e., Y, M, C, and B copies are prepared from a single full-color image, the full-color image is separated by a color scanner to obtain four monochromatic images whose densities respectively correspond to levels of Y, M, C, and B color components. These monochromatic images are converted into dot pictures to prepare the corresponding block copies.

The above method requires an expensive color scanner, and color separation is also cumbersome and time-consuming.

SUMMARY OF THE INVENTION

It is a first object of the present invention to provide a thermal printer capable of easily preparing block copies for the respective colors by adding a simple printing plate making mode to a conventional printer without using an expensive color scanner.

It is a second object of the present invention to provide a thermal printer wherein alignment mark data and color identification mark data (gray scale data or color bar data) are stored in a memory and can be selectively read out during printing.

It is a third object of the present invention to provide a thermal printer, wherein the alignment marks are automatically printed outside an effective image area at predetermined positions with high precision.

DETAILED DESCRIPTION OF THE PREFERRED EMBODIMENT

In this embodiment, Y, M, C, and B block copies are prepared by the thermal printer. The thermal printer has a printing plate making mode. In the printing plate making mode, Y, M, C, and B ink ribbon sheets are not used, but only B (black) ink ribbon is used. The same ink ribbon is used for each one of the four colors, and thus four monochromatic images corresponding to the densities of these colors are obtained. The four monochromatic images are converted into four dot pictures to prepare four block copies.

Figure 4:
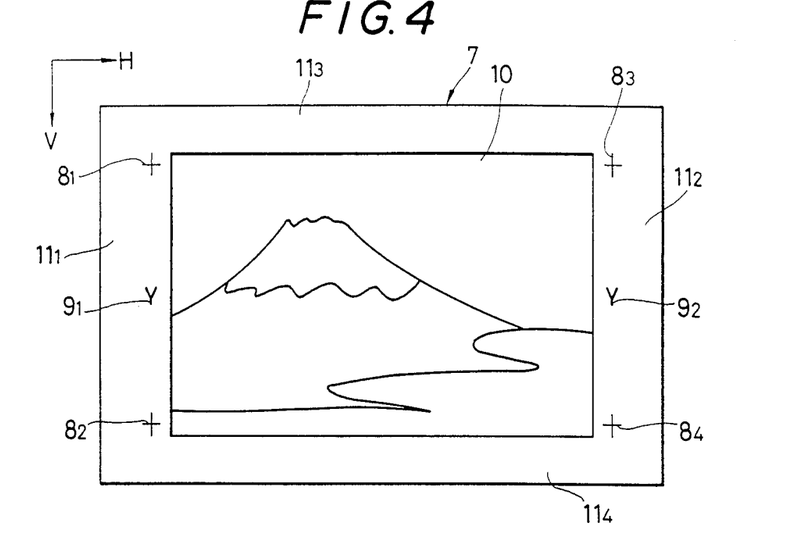
FIGS. 4 and 5 are views showing a printing pattern printed with alignment marks outside the effective image area.

In this embodiment, print positioning marks $8_1$ to $8_4$ and color information data $9_1$ and $9_2$ are also recorded at predetermined positions of an image area 7, as shown in FIG. 4. Since the marks $8_1$ to $8_4$ and information data $9_1$ and $9_2$ are recorded outside the effective image area, the four block copies can be easily positioned at the time of full-color image printing, and the color of each block copy can be easily identified.

Referring to FIG. 4, the image area 7 includes an effective image area 10 used for actually recording an image. Left, right, upper, and lower blank portions $11_1$ to $11_4$ each having a predetermined width are formed to define the effective image area 10 in the image area 7. The number of picture elements along the H direction of the effective image area 10 is, e.g., 784, and the number of picture elements along the V direction is, e.g., 466.

Figure 5:
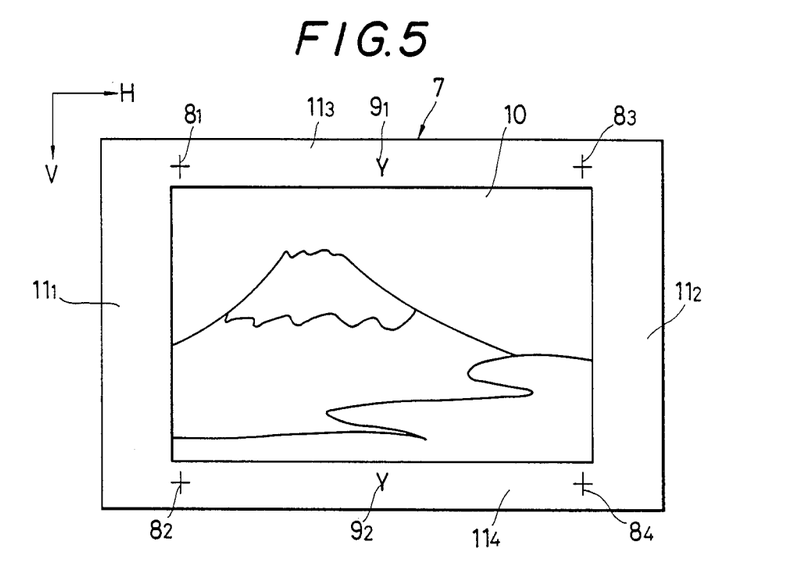

The print positioning marks $8_1$ to $8_4$ are recorded as crosses at upper and lower predetermined positions of the left and right blank portions $11_1$ and $11_2$. The color information data $9_1$ and $9_2$ of "Y" representing yellow are formed substantially at the centers between the upper and lower marks. It should be noted that the color information data $9_1$ and $9_2$ represent "Y", "M", "C", or "B" according to a given color. The marks $8_1$ to $8_4$ and information data $9_1$ and $9_2$ are formed within the area where 466 picture elements are present along the V direction of the effective image area 10. Therefore, the marks $8_1$ to $8_4$ and information data $9_1$ and $9_2$ can be recorded by the 466 heating elements 6 (of the thermal head 4) used for recording an image of the effective image area. These marks may be recorded in the upper and lower blank portions $11_3$ and $11_4$, as shown in FIG. 5. In this case, the marks $8_1$ to $8_4$ and information data $9_1$ and $9_2$ can be recorded by the heating elements 6 outside those (a total number of heating elements 6 along the V direction is 512) used for recording an image within the effective image area. Referring to FIGS. 4 or 5, the pair of print positioning marks $8_1$ and $8_2$ and the pair of print positioning marks $8_3$ and $8_4$ are respectively recorded in the left and right blank portions $11_1$ and $11_2$, or the pair of print positioning marks $8_1$ and $8_3$ and the pair of print positioning marks $8_2$ and $8_4$ are respectively recorded in the upper and lower blank portions $11_3$ and $11_4$. However, one print positioning mark may be recorded in each of the left and right blank portions $11_1$ and $11_2$ or each of the upper and lower blank portions $11_3$ and $11_4$. Similarly only one of the color information data $9_1$ and $9_2$ may be used in the pattern shown in FIGS. 4 or 5. The pattern of the print positioning marks $8_1$ to $8_4$ and the symbols of the color information data $9_1$ and $9_2$ may be modified by use of other shapes and symbols.

Figure 3:
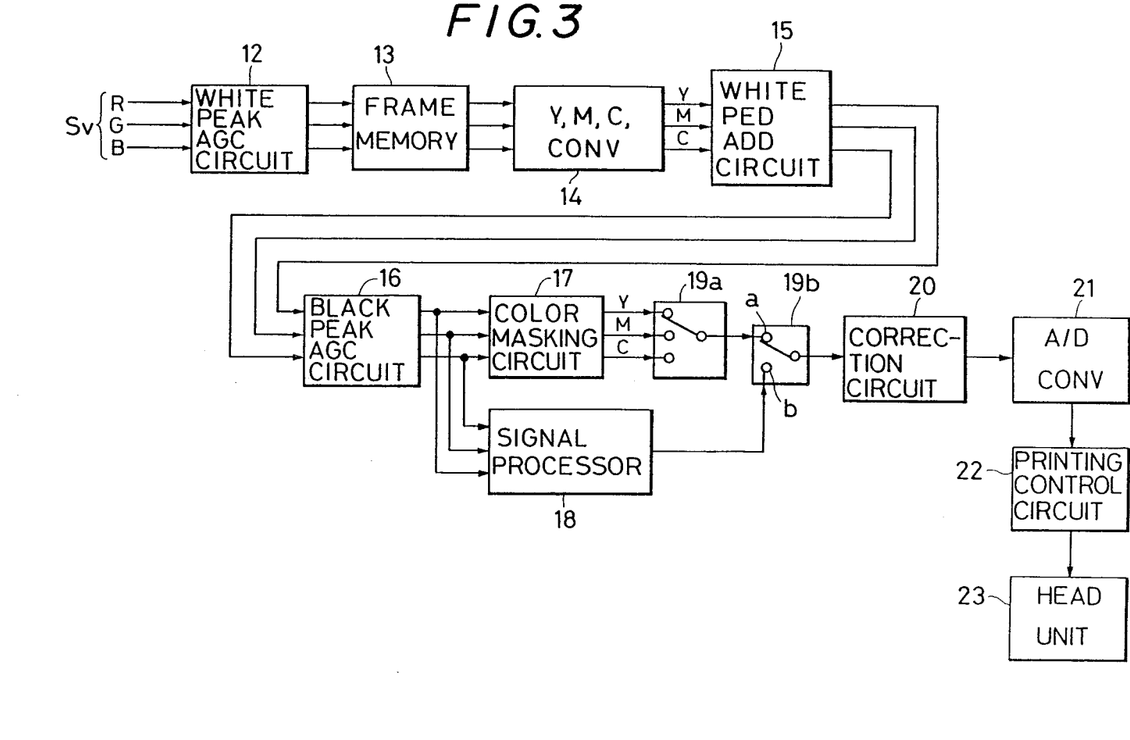
FIG. 3 is a block diagram of a thermal printer according to an embodiment of the present invention.

FIG. 3 shows an embodiment of the thermal printer having the printing plate making mode. In this case, an image obtained from a video signal is recorded.

Referring to FIG. 3, the gain of a video signal Sv is controlled by a white peak AGC (Automatic Gain Control) circuit 12, and a one-frame AGC-controlled video signal is written in a frame memory 13 in the form of digital data signals. A signal read out from the memory 13 is converted into an analog signal. An A/D converter (not shown) is connected to the input terminal of the memory 13, and a D/A converter (not shown) is connected to the output terminal of the memory 13. The video signal read out from the memory 13 is converted by a Y, M, C converter 14 from R, G and B signal components to Y, M, and C signal components. The converted signal is supplied to a white pedestal addition circuit 15. A white pedestal level pulse is added to the converted signal during the blanking period. The gain of the signal with the pedestal level is controlled by a black peak AGC circuit 16. The AGC-controlled signal from the black peak AGC circuit 16 is supplied to a color masking circuit 17 and a signal processor 18. A switch 19a is operated to sequentially select the Y, M, and C components. In the normal printing mode, a switch 19b is set in the position of a contact a. However, in the print plate making mode, the switch 19b is set in the position of a contact b. In the normal printing mode, undercolor removal of the Y M, and C signal components is performed in the color masking circuit 17, and the resultant signal components are supplied to a correction circuit 20 through the switches 19a and 19b. In the print plate making mode, signal processing (e.g., density conversion in addition to undercolor removal) for print plate making is performed, and the resultant color components are supplied to the correction circuit 20 through the signal processor 18 and the switch 19b.

Necessary correction such as edge correction is performed in the correction circuit 20. The corrected signal is converted into a digital signal by an A/D converter 21. The digital signal from the A/D converter 21 is applied to a printing control circuit 22. The print positioning marks $8_1$ to $8_4$ and the color information data $9_1$ and $9_2$ are added to the digital signal by the control circuit 22. At the same time, the control circuit 22 also performs predetermined correction operations. An output from the printing control circuit 22 is supplied to a head unit 23 which includes a head driver and the thermal head 4. Information is then recorded by the head unit 23 on recording paper (not shown).

In the normal printing mode, Y, M, and C, components in an order of Y, M, and C are sequentially recorded on single recording paper, to obtain a single full-color image along the V direction. In the print plate making mode, only black ink is used, and the paper is scanned in the order of Y, M, C, and B. Recording progresses in the V line direction, thereby obtaining four monochromatic images which respectively correspond to Y, M, C, and B images.

Figure 6:
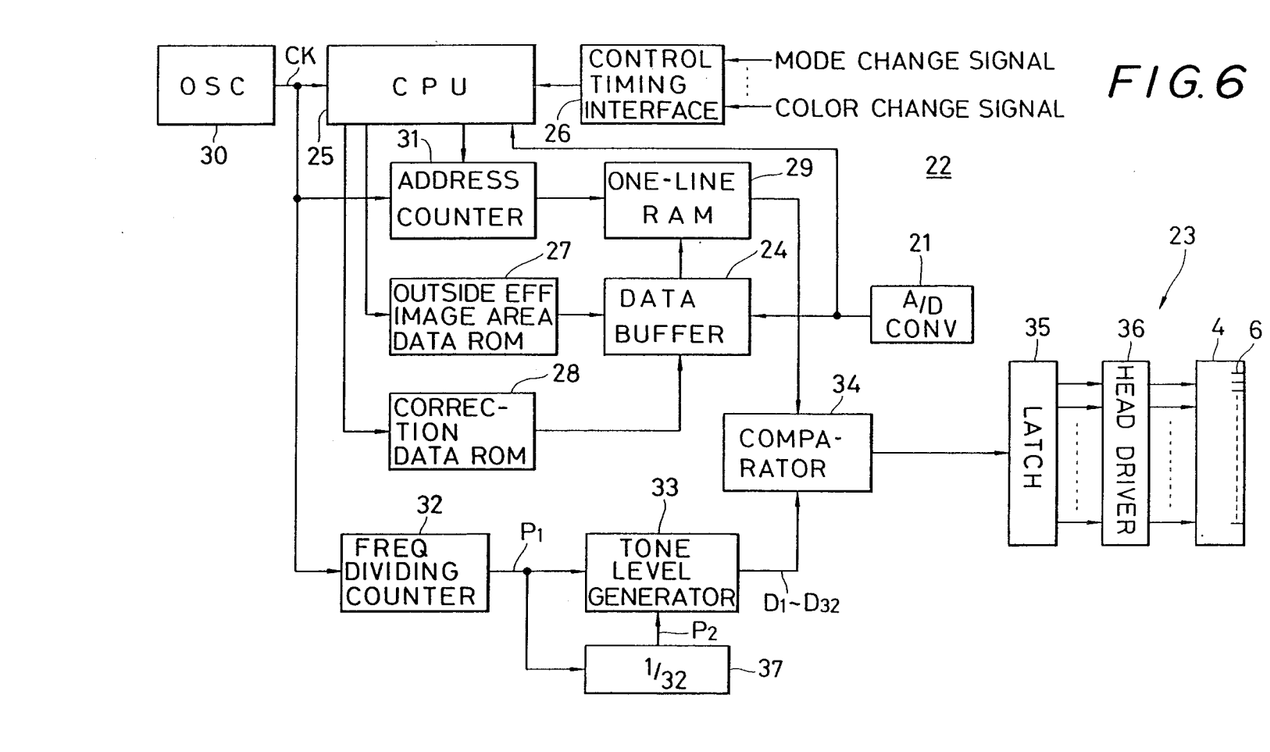
FIG. 6 is a block diagram of the printing control circuit shown in FIG. 3.

FIG. 6 shows a detailed arrangement of the printing control circuit 22.

In this embodiment, the energization time of each heating element 6 of the thermal head 4 is controlled according to the required density of the image. For this purpose, a control signal comprises a PWM (Pulse-Width Modulated) signal having a pulse width corresponding to the density of each picture element.

Referring to FIG. 6, image data from the A/D converter 21 (FIG. 3) is supplied to a data buffer 24 associated with a CPU 25 in the printing control circuit 22. The CPU 25 is operated in response to a mode change signal, a color change signal, and other timing signals, all of which are applied to a control timing interface 26. The CPU 25 generates address data signals for a ROM 27 and a correction data ROM 28, in response to the image data, the color change signal, and so on. The ROM 27 stores data representing the marks outside the effective image area. The address data signals are supplied to the ROMs 27 and 28. The ROM 27 stores marking data for displaying the print positioning marks $8_1$ to $8_4$ and the color information data $9_1$ and $9_2$, as shown in FIGS. 4 and 5. The marking data is read out at predetermined times in response to the address data signals supplied from the CPU 25. The readout marking data is sent to the data buffer 24. The ROM 28 stores correction data such as gamma correction data. The correction data is read out at predetermined times in response to the address data signals supplied from the CPU 25. The readout data is sent to the data buffer 24.

The data buffer 24 receives the image data, the marking data, and the correction data in units of V lines. The V line data is written from the buffer into a one-line RAM 29, in response to address data supplied from an address counter 31.

An oscillator 30 generates clock pulses (or a clock) CK having a predetermined pulse repetition rate or frequency. The clock CK is supplied to the CPU 25, the address counter 31, and a frequency dividing counter 32. The address counter 31 addresses the data in the RAM 29 for writing and reading out the single line of data stored therein, in series.

A reference tone level generator 33 generates density reference level data representing one of several tone levels every time a carry pulse P1 is sent from the frequency dividing counter 32 thereto. In this embodiment, the density is represented by one of 32 tone levels D1 to D32, for example. The reference levels D1 to D32 are sequentially generated and supplied to a comparator 34. If the reference level D1 is generated, 466 data signals of the first V line are sequentially read out from the RAM 29 and are sequentially compared with the level D1. If the readout data has a level higher than the level D1, the comparator 34 generates a logic "1" (i.e., high level). Otherwise, the comparator 34 generates a logic "0" (i.e., low level). The output from the comparator 34 is stored at the corresponding address of a latch 35. When comparison associated with the level D1 is completed, the contents stored in the latch 35 are supplied to the corresponding heating elements 6 in the thermal head 4 through a head driver 36. The heating elements 6 which receive the logic "1" are energized to perform printing. During printing associated with the reference level D1, the next 466 data signals are sequentially compared with the reference level D2, and the sequential outputs of the comparator 34 are latched by the latch 35 and are applied to the thermal head 4 through the head driver 36, thereby energizing the heating elements 6 which receive the logic "1". Similarly, the heating elements 6 are energized when the result of the comparison, respectively, with the reference levels D2 to D32 represents a logic "1". However, when the comparison result represents a logic "0", the corresponding heating elements 6 is deenergized. In this case, the energization pulse for each of the heating elements 6 comprises a PWM pulse having a pulse width corresponding to the density of the picture element pixel corresponding to the heating element 6.

When the printing of one V line is completed, the tone level generator 33 is reset in response to a carry pulse P2 from a counter 37 which receives the pulse P1 and effects a 1/32 frequency-dividing.

When the first V line is completely printed, the drum 1 in FIG. 1 is rotated by one pitch of the picture element and is stopped. Data of the second V line is converted into the PWM signals, and information represented by the PWM signals is printed in the same manner as described above. When printing is completed, the drum 1 is rotated by one pitch of the picture elements. The above operation is repeated to complete scanning along the H direction, thereby printing the entire image.

The print positioning marks $8_1$ to $8_4$ and the color information data $9_1$ and $9_2$ are recorded as data representing the marks outside the effective image area. However, the data representing the marks outside the effective image area may include other necessary print plate making data, such as gray scale data and color bar data. The gray scale data and the color bar data may be stored in the ROM 27 and can be selectively read out and printed in the blank portions $11_1$ to $11_4$.

Figure 7A:
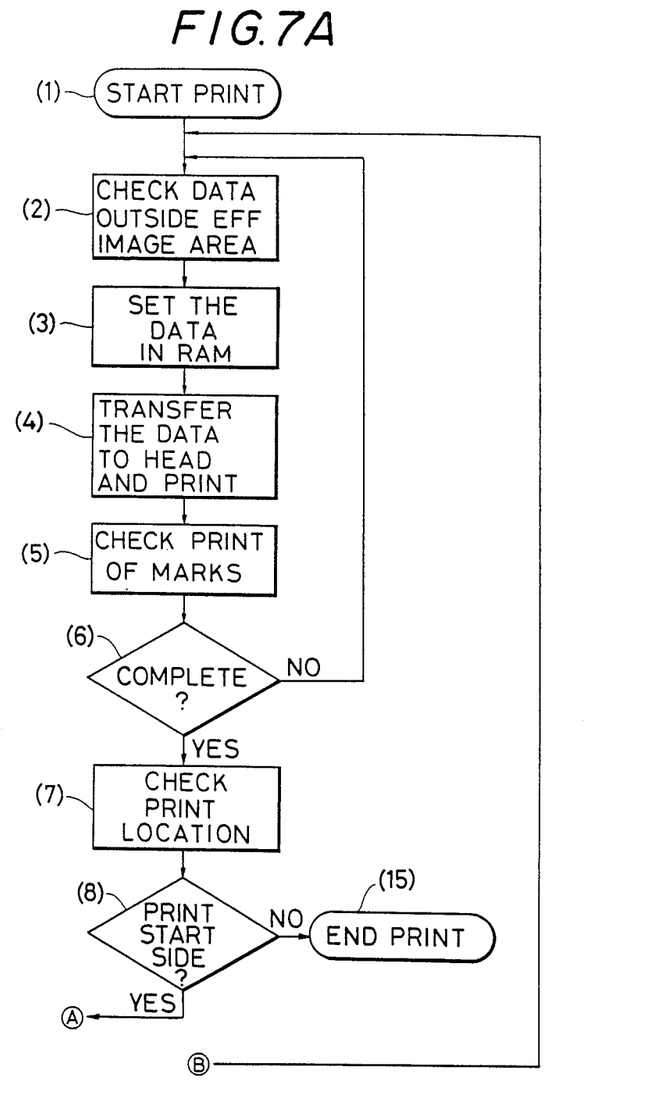
FIGS. 7A–7B comprise a flow chart for explaining printing under the control of the control circuit shown in FIG. 6.
Figure 7B:
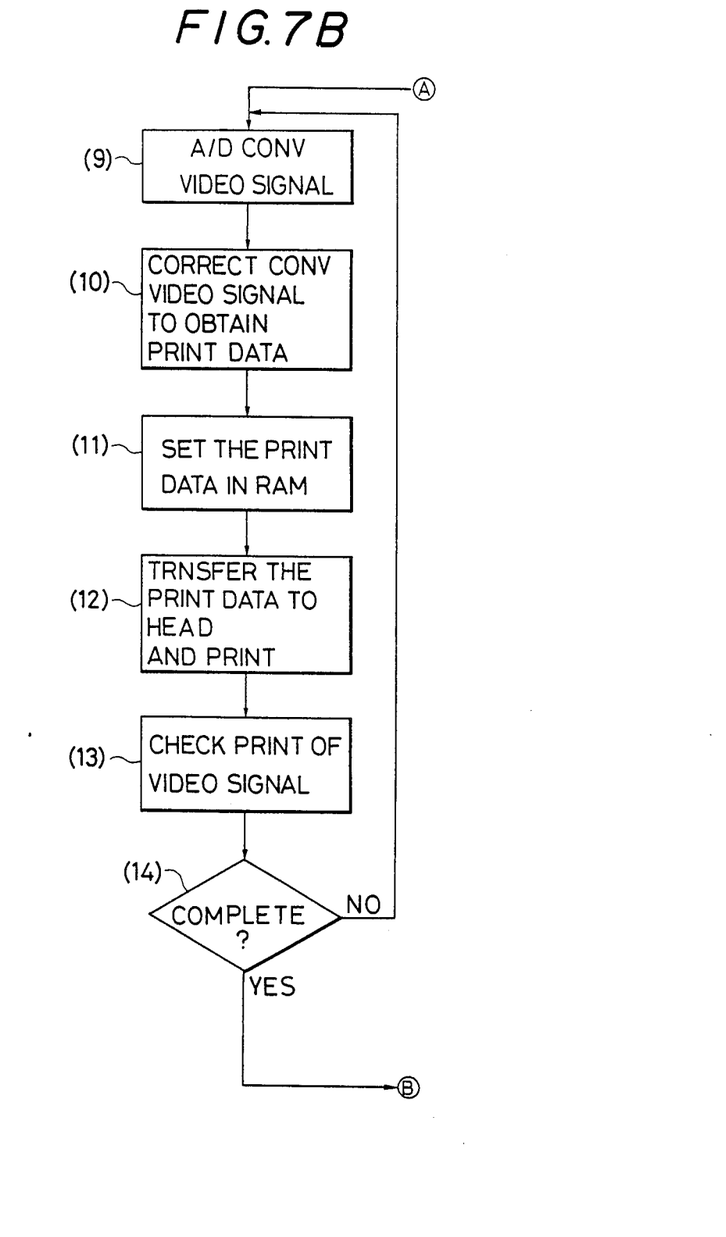

FIGS. 7A and 7B constitute a flow chart for executing printing by using the recording pattern of FIG. 4 in the block-making mode.

Printing is started in step (1), and data representing the marks outside the effective area is checked in step (2). In particular, the CPU 25 checks in step (2) that the color information data $9_1$ and $9_2$ are properly received. In step (3), the data representing the marks outside the effective image area is set into the RAM 29, to print the predetermined marks or the like. In step (4), the data is read out from the RAM 29 and is transferred to the head unit 23 to print the data. The CPU 25 checks in step (5) that the predetermined marks have been properly printed. The CPU 25 determines in step (6) whether printing of the predetermined marks is completed. If not, the flow returns to step (2) and printing continues. If YES in step (6), the flow advances to step (7). In step (7), the currently printed marks are checked to be located on the printing start or end side, i.e., in the blank portion $11_1$ or $11_2$ in FIG. 4. The CPU 25 determines in step (8) whether the marks are printed on the printing start side, i.e., in the blanking portion $11_1$. If YES in step (8), i.e., the marks $8_1$, $8_2$ and information data $9_1$ are printed in the blank portion $11_1$, the flow advances to step (9) to print the effective image 10.

In step (9), the video signal SV is A/D converted. In step (10), correction data is read out from the ROM 28 and added to the digital video signal to obtain printing data. The printing data is set into the RAM 29 in step (11). In step (12), the data is read out from the RAM 29 and is transferred to the head unit 23, thereby printing the image data.

The CPU 25 checks printing of the video signal in step (13) and determines in step (14) whether printing is completed. If NO in step (14), the flow returns to step (9). However, if YES in step (14), the flow returns to step (2).

In step (2) and the subsequent steps (3), (4), . . . (7), printing of the marks $8_3$, $8_4$ and information $9_2$ in the blank portion $11_2$ is performed. If NO in step (8), the CPU 25 determines that the marks are printed on the printing end side (i.e., the blank portion $11_2$). In this case, the flow advances to step (15), and printing is ended.

Referring to FIGS. 7A-7B, in the normal printing mode, the flow jumps from step (1) to step (9), and the operations in steps (9) to (14) are performed. If YES in step (14), printing is ended.

When printing is performed according to the recording pattern in FIG. 5 in the block-making mode, data representing the marks (i.e., the marks $8_1$ to $8_4$ and information data $9_1$ and $9_2$) outside the effective image area is equivalently dealt as the image data. In this case, the operations in steps (9) to (14), i.e., the operations in the normal printing mode, are performed. However, it should be noted that the data set into the RAM 29 includes image data and also the data representing the marks outside the effective image area.

According to the preferred embodiment of the present invention as described above, Y, C, M, and B block copies can be easily prepared. In addition, the print positioning marks $8_1$ to $8_4$, the color information data $9_1$ and $9_2$, or the like of each block copy can be automatically printed at predetermined positions of the image area with high precision.

It is apparent that various modifications and additions can be made in the apparatus of the present invention without departing from the essential feature of novelty thereof, which are intended to be secured by the appending claims.

We claim:

1. A thermal printer for making a plurality of printing images of a plurality of block copies corresponding to respective separate color separations of a color image, comprising:
   input means for receiving color video signals corresponding to said color image to be printed;
   thermal head means;
   signal processing means connected to said input means for converting said color video signals into printing color signals suitable for making block copies for said color image;
   signal generating means for generating printing information data relating to printing plate making for said color image; and
   supplying means to supply said printing color signals to said thermal head means, together with said related printing plate making information data.

2. The thermal printer as cited in claim 1, wherein said printing plate making information data includes printing color information data and print positioning marks.

3. The thermal printer as cited in claim 1, wherein said printing plate making information data are supplied to said thermal head means at times when there are not said printing color signals.

4. The thermal printer according to claim 1, wherein said signal processing means comprises means for deriving color component signals from said video signals corresponding to a yellow, a magenta or a cyan component, adjusted for representations of white and black levels, said supplying means comprising printing control circuit means being operative to supply printing color signals corresponding to said color component signals to said thermal head means.

5. The thermal printer according to claim 4, wherein said thermal head means includes a plurality of individual heating elements, said printing control circuit means comprises data buffer means for storing said color component signals, memory means for storing a single line of data corresponding to said printing color signals, and means for selectively supplying said stored line of data to said heating elements in accordance with said color component signals.

6. The thermal printer according to claim 5, including tone level generator means for successively manifesting a plurality of tone signals corresponding to variations in density of a printed image, comparator means connected to said tone level generator means and to said memory means for supplying a printing color signal to each of said heating elements which is a PWM function of a predetermined density of a color image produced by such heating elements.

7. The thermal printer according to claim 6, wherein said printing control circuit includes a central processing unit and means under control of said central processing unit for reading and writing said memory means in synchronism with cycles of operation of said thermal printer.

* * * * *